US011596050B2

United States Patent
Black et al.

(10) Patent No.: US 11,596,050 B2
(45) Date of Patent: Feb. 28, 2023

(54) CONTINUOUS, VELOCITY-CONTROLLED THREE-DIMENSIONALLY LASER-COOLED ATOM BEAM SOURCE WITH LOW FLUORESCENCE

(71) Applicant: The Government of the United States of America, as represented by the Secretary of the Navy, Arlington, VA (US)

(72) Inventors: Adam Black, Annandale, VA (US); Mark Bashkansky, Alexandria, VA (US); Charles Fancher, Fairfax, VA (US); Jonathan Kwolek, Arlington, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 232 days.

(21) Appl. No.: 17/160,564

(22) Filed: Jan. 28, 2021

(65) Prior Publication Data
US 2021/0243877 A1    Aug. 5, 2021

Related U.S. Application Data

(60) Provisional application No. 62/968,179, filed on Jan. 31, 2020.

(51) Int. Cl.
*H05H 3/02* (2006.01)
*G02B 27/28* (2006.01)
*H01S 3/00* (2006.01)

(52) U.S. Cl.
CPC ............. *H05H 3/02* (2013.01); *G02B 27/283* (2013.01); *H01S 3/0071* (2013.01)

(58) Field of Classification Search
CPC ........ H05H 3/02; G02B 27/283; H01S 3/0071
(Continued)

(56) References Cited

U.S. PATENT DOCUMENTS

| 6,303,928 | B1 * | 10/2001 | Buell ................. B82Y 15/00 |
| | | | 250/251 |
| 7,317,184 | B2 | 1/2008 | Kasevich et al. |
| 9,019,506 | B1 | 4/2015 | Black et al. |

FOREIGN PATENT DOCUMENTS

WO    WO-2019032159 A2 *  2/2019  .............. G04F 5/14

OTHER PUBLICATIONS

R. Geiger, A. Landragin, S. Merlet, and F. Pereira Dos Santos, "High-accuracy inertial measurements with cold-atom sensors," AVS Quantum Science 2, 024702 (2020).
(Continued)

*Primary Examiner* — Michael Maskell
(74) *Attorney, Agent, or Firm* — US Naval Research Laboratory; Joslyn Barritt

(57) ABSTRACT

Method and apparatus for producing a cooled atom beam suitable for use applications requiring cold atoms. A two-stage cooling process is employed in which the atoms in the atom beam are cooled in two, spatially separated regions of a cooling apparatus, wherein the atoms are first cooled in two dimensions by two counterpropagating laser beams under a magnetic field and then are cooled in three dimensions by means of an optical molasses, where the power, frequency, and magnetic fields are tuned to obtain a continuous beam of three-dimensionally cooled atoms having a controllable velocity distribution, very low decoherence, and low background atomic gas loss.

6 Claims, 5 Drawing Sheets

(58) Field of Classification Search
USPC .......................................... 250/251; 331/94.1
See application file for complete search history.

(56) References Cited

OTHER PUBLICATIONS

I. Dutta, D. Savoie, B. Fang, B. Venon, C. L. Garrido Alzar, R. Geiger, and A. Landragin, "Continuous Cold-Atom Inertial Sensor with 1 nrad/sec Rotation Stability," Phys. Rev. Lett. 116, 183003 (2016).
Jon P. Davis and Frank A. Narducci, "Raman spectroscopy in the presence of stray resonant light," Appl. Opt. 55, C39-C45 (2016).

* cited by examiner

Side View

Top View

CONTINUOUS, VELOCITY-CONTROLLED THREE-DIMENSIONALLY LASER-COOLED ATOM BEAM SOURCE WITH LOW FLUORESCENCE

CROSS-REFERENCE

This Application is a Nonprovisional of and claims the benefit of priority under 35 U.S.C. § 119 based on U.S. Provisional Patent Application No. 62/968,179 filed on Jan. 31, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #112002.

TECHNICAL FIELD

The present invention relates to the formation of atom beams, specifically to a method and apparatus for creating and delivering a continuous, velocity-controllable beam of three-dimensionally sub-Doppler-cooled atoms that may be used to operate an atomic clock, atom interferometer, atomic magnetometer, or other atom-based sensor or device.

BACKGROUND

Atomic clocks, atom interferometers, atom-based magnetometers and other atom-based sensors rely on sources of either hot or cold atomic gases within vacuum cells. Hot atom sources include vapor cells at room temperature or higher, or atom beams emitted from ovens, which have root-mean-square atomic velocities of hundreds of meters per second. Cold atoms are generated from hot atomic vapors by laser cooling and/or trapping. Common examples of cold atom sources include 3D magneto-optical traps and 3D optical molasses, both of which cool atoms in three dimensions and cool atoms to root-mean-square atomic velocities of centimeters per second. Some atom sources are partially cooled, such as 2D magneto-optical traps that trap and cool atoms in two dimensions but do not cool in the third dimension.

Clocks, sensors and atom interferometers based on hot, continuously emitted atom beams are able to measure continuously and with high bandwidth by addressing the continuous stream of atoms using lasers or other electromagnetic fields. However, the large spread in atomic velocity inherent in hot atom sources reduces measurement sensitivity by a number of mechanisms. For example, in the case of atom interferometers and Ramsey atomic clocks, interference fringe contrast is reduced because of Doppler shifts and inhomogeneous coupling to atoms due to their finite velocity distribution. The total free quantum evolution time allowed in hot atom beam sources is typically short because of the high mean atomic velocity. The large distribution of atomic velocities can also create unwanted susceptibility to dynamic effects such as accelerations and rotations of atoms in the beam.

Laser cooling of atoms employs a set of laser beams directed at a vapor of gas-phase atoms in a vacuum chamber, where the laser is tuned to a frequency near an atomic resonance frequency in order to narrow the velocity distribution of the atoms. Additionally, magnetic fields applied within the chamber modify the cooling force to create a trap for the atoms so that they form a beam.

In contrast to hot atomic beams, three-dimensionally laser-cooled atomic samples provide better sensitivity in atom-based clocks, interferometers and sensors. However, in most prior art systems, three-dimensional laser cooling has been performed by pulsed techniques, in which a single measurement cycle consists of a cooling and/or trapping period, followed by a measurement period in which the cooled atoms are employed for sensing. See, e.g., R. Geiger, A. Landragin, S. Merlet, and F. Pereira Dos Santos, "High-accuracy inertial measurements with cold-atom sensors," *AVS Quantum Science* 2, 024702 (2020).

This leads to the significant drawbacks of reduced bandwidth due to the limitations of time needed to cool the atoms, as well as "dead time," i.e., periods in which no measurement occurs within the measurement cycle. Dead time can present as stability reduction by the Dick effect in atomic clocks, and aliasing as well as navigation errors in inertial measurement systems based on atom interferometry.

Some prior art has addressed the dead time and bandwidth deficiencies of cold-atom sources by operating in a "zero-dead-time" mode in which the periodic process of cooling and/or trapping of atoms occurs in one spatial region of the vacuum system while measurement takes place simultaneously on a previously prepared ensemble of atoms in a nearby region. See U.S. Pat. Nos. 7,317,184; 9,019,506; and I. Dutta, D. Savoie, B. Fang, B. Venon, C. L. Garrido Alzar, R. Geiger, and A. Landragin, "Continuous Cold-Atom Inertial Sensor with 1 nrad/sec Rotation Stability," *Phys. Rev. Lett.* 116, 183003 (2016).

However, as illustrated by the block schematic in FIG. 1, if the cooling laser light is near the resonant atomic frequency, the cooling light scattered into the measurement region will destroy the quantum superposition that atomic clocks, interferometers and sensors rely upon for operation. See Jon P. Davis and Frank A. Narducci, "Raman spectroscopy in the presence of stray resonant light," *Appl. Opt.* 55, C39-01.5 (2016). The goal of laser cooling is to change the velocity vector of each atom from its initial value $v_{in}$ (with the value of yin being different for each atom and drawn from a distribution of velocities) to a predetermined final value $v_{OM}$, which may be zero—i.e., stationary in the laboratory frame of reference—or nonzero. As a result, the distribution of final velocities is narrowed compared to the distribution of initial velocities. The capture velocity v of a laser cooling system is defined herein as the maximum value of the velocity difference $|v_{in}-v_{OM}|$ for which the atomic velocity is successfully modified from $v_{in}$ to a value very close to $v_{OM}$. Laser cooling methods having a high capture velocity, such as those designed to cool from a warm atomic vapor to a near-zero velocity, typically induce the emission of greater power of near-resonant light per atom than do laser cooling methods having a low capture velocity.

Laser cooling of atoms simultaneously with quantum coherent processes can be effective for stationary platforms if the ballistic flight of the atoms is of long enough duration to impart significant curvature of the atomic trajectory due to gravity, allowing optical baffles to block the near-resonant cooling light from the measurement region. Alternatively, for sufficiently long atomic trajectories, the falloff of scattered light intensity with distance mitigates this effect.

However, if such predictable trajectory curvature or long atomic propagation is not possible due to size or dynamics constraints, then the near-resonant cooling light from the cooling region will scatter from the atoms in the measurement region and degrade interferometer performance in a cold-atom device that operates continuously and without dead time.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method and apparatus for continuously producing a cooled atom beam suitable for use in interferometers, atomic clocks, and other applications requiring cold atoms.

In accordance with the present invention, a two-stage cooling process is employed in which the atoms in the atom beam are cooled in two, spatially separated regions of a cooling apparatus, wherein the atoms are first cooled in two dimensions by a two pairs of counterpropagating laser beams under an applied magnetic field (the "2D+ MOT") and then are cooled in three dimensions by means of an optical molasses comprising three pairs of counterpropagating, mutually orthogonal laser beams (the "3D OM"), where the power, frequency, and magnetic fields are tuned to obtain a continuous beam of three-dimensionally cooled atoms having a controllable velocity distribution, very low decoherence, and low loss due to the presence of background atomic gas.

By spatially separating the regions of the apparatus in which each of these cooling processes is performed in accordance with the present invention, it is possible to both shield downstream atoms from the relatively strong fluorescence of the first stage and provide effective 3D cooling of the atom beam. In addition, by choosing appropriate parameters for the 3D OM, it is possible to provide high atom beam flux, low atom temperatures, and low decoherence of downstream quantum coherent processes resulting from cooling-induced fluorescence in the OM.

DETAILED DESCRIPTION

Figure 1:
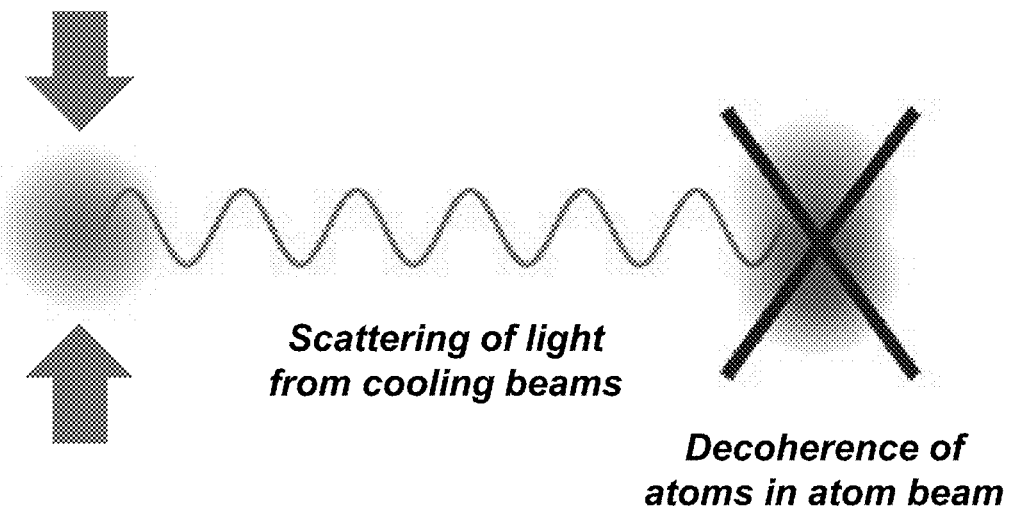
FIG. 1 is a block schematic illustrating the decoherence resulting from scattering effects of laser cooling of atoms conducted in accordance with the prior art.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As discussed above, atomic clocks, atom interferometers, and other atom-based sensors benefit from the use of cold atoms. Pulsed modes of operation that extinguish cooling light during interferometer operation lead to unwanted dead time, while continuous cooling during interferometer operation can destroy the desired quantum superposition of atomic states in the beam.

The present invention overcomes these problems by using a two-stage cooling process in which the atoms in the atom beam are cooled in two, spatially separated regions of a cooling apparatus, wherein the atoms are first cooled in two dimensions by a two pairs of counterpropagating laser beams under an applied magnetic field (the "2D+ MOT") and then are cooled in three dimensions by means of an optical molasses comprising three pairs of counterpropagating, mutually orthogonal laser beams (the "3D OM"). By spatially separating the regions of the apparatus in which each of these cooling processes is performed in accordance with the present invention, it is possible to both shield downstream atoms from the relatively strong fluorescence of the first stage and provide effective 3D cooling of the atom beam. In addition, the parameters for the laser beams and the magnetic fields can be tuned to obtain a continuous beam of three-dimensionally cooled atoms having a predetermined controllable velocity distribution, low decoherence, and low loss due to the presence of background atomic gas.

As a result, the two-stage cooling approach in accordance with the present invention can achieve a reduction in downstream decoherence, as reduced capture velocity in the 3D OM relative to the 2D+ MOT reduces the total cooling fluorescence power, and increased detuning from atomic resonance reduces the cross-section for reabsorption of the cooling fluorescence by downstream atoms.

The final temperatures achievable in polarization gradient cooling depend on the magnitude of the light shift induced by the cooling beam and on the available cooling time. Both reducing intensity and increasing detuning have the effect of reducing the light shift, thereby improving the final temperature of the 3D OM stage. Increasing the detuning has the additional benefit that the resulting fluorescence is predominantly at the larger detuning from atomic resonance and therefore has a lower absorption cross section for downstream atoms. For this reason, the 3D OM is advantageously operated at a wavelength having a relatively large detuning $\Delta_{OM}$, i.e., distance in frequency, from the atomic resonance frequency $\omega_0$. The mean frequency detuning typically ranges between $-10\Gamma_0$ and $-2\Gamma_0$, where $\Gamma_0$ is the natural linewidth of the cooling resonance of the atoms in the atom cloud. In an exemplary case, $\Delta_{OM}=-6\Gamma_0$, though detunings having other values may be applied as appropriate.

Figure 2:
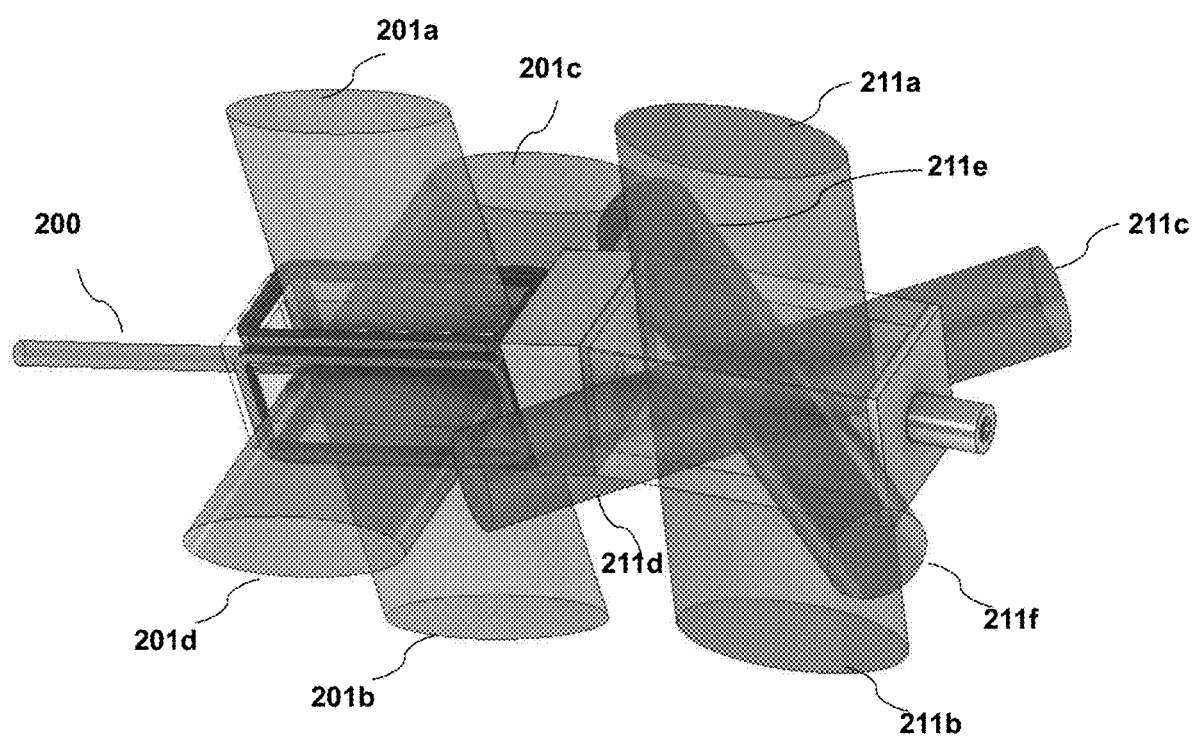
FIG. 2 is a three-dimensional CAD image illustrating aspects of a method and apparatus for two-stage laser cooling of atoms in accordance with the present invention.

FIG. 2 is a three-dimensional CAD schematic that provides an overview of the method and apparatus for producing a continuous, velocity-controlled three-dimensionally laser-cooled atom beam having low fluorescence in accordance with the present invention.

As illustrated in FIG. 2 and as described in more detail below, the atom beam is produced using a two-stage process in a vacuum chamber having a first cooling region and a second cooling region.

In the first stage of this process, an atom vapor in the first cooling region (shown as the "left" cooling region in the FIG. 2) undergoes an initial cooling provided by two pairs of counterpropagating laser beams 201a/201b and 201c/201d under a magnetic field which modifies the cooling force of the initial laser beams to create a trap for the atoms so that they form an atom beam travelling through the chamber. A push beam 200 enhances the flux and increases the velocity of the atoms in the beam.

The initially cooled beam is then directed into a right cooling region of the chamber, which is offset at an angle relative to the axis of the left cooling region, where it is subjected to a three-dimensional optical molasses ("3D OM") in which three sets of counterpropagating laser beams comprising beams 211a/211b in the z–/z+ direction and beams 211c/211d and 211e/211f in the x-y plane to produce a three-dimensionally cooled atom beam. As noted above and as described in more detail below, by spatially separating the regions of the apparatus in which each of these cooling processes is performed and tuning the parameters of the laser beams and the magnetic field, downstream atoms can be shielded from the relatively strong fluorescence of the first stage so that a three-dimensionally cooled atom beam having a predetermined controllable velocity distribution, low decoherence, and low loss due to the presence of background atomic gas can be obtained.

It should be noted that in addition to the cooling beams applied to the atoms in the left and right cooling regions, repump beams known in the art (not shown) are applied to the cooled atoms in both the left cooling regions to ensure that the atoms remain at energy levels that permit cooling to occur.

Figure 3A:
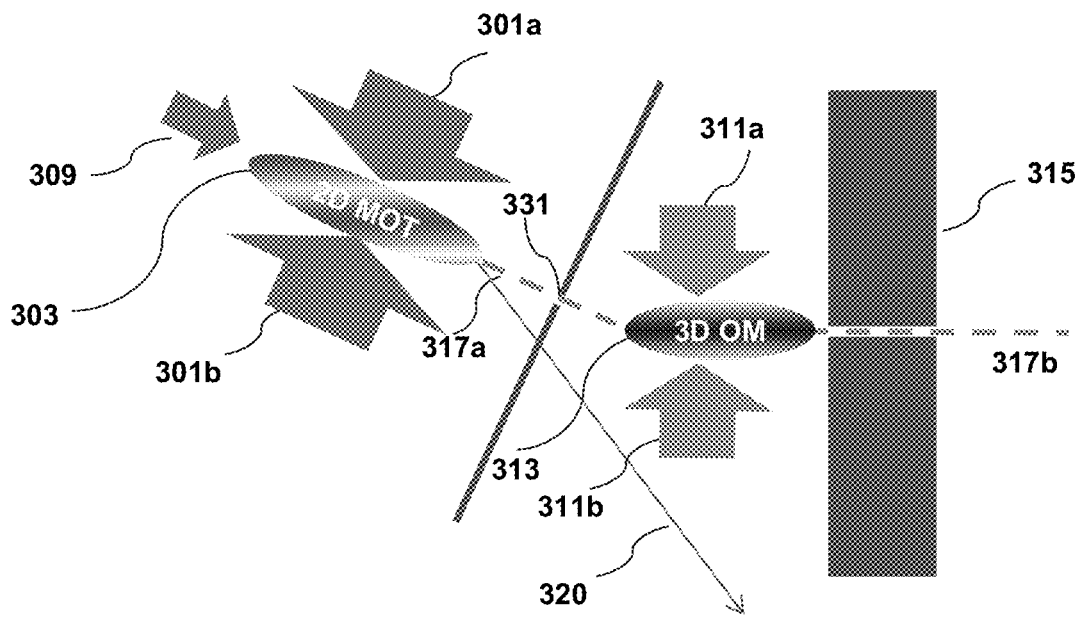
FIGS. 3A and 3B are block schematics illustrating aspects of two-stage laser cooling of atoms in accordance with the present invention.
Figure 3B:
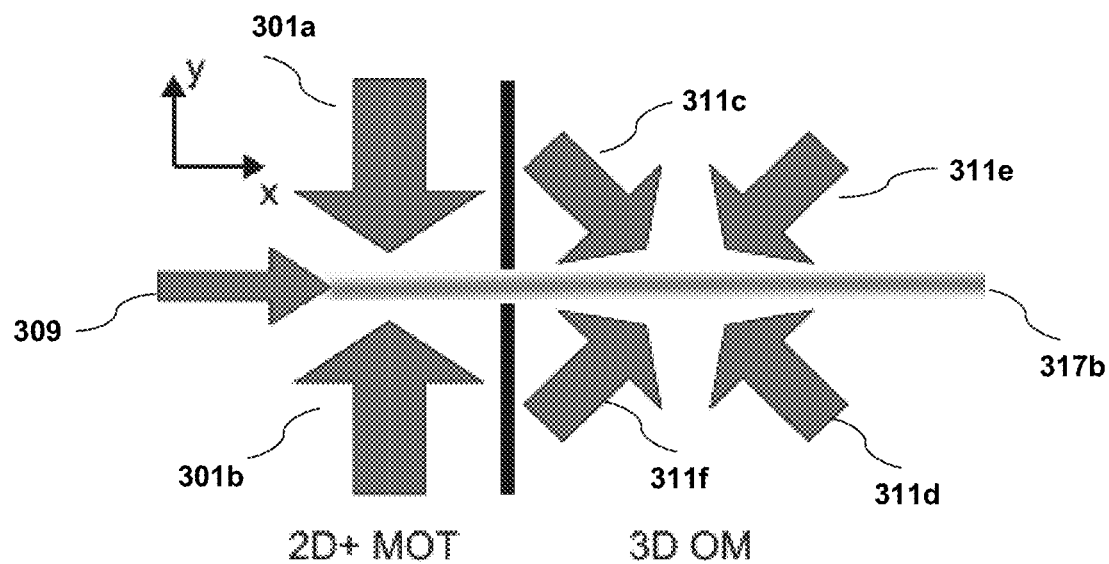

The block schematics in FIGS. 3A and 3B represent a side view and a top view, respectively, of the two-stage cooling process in accordance with the present invention, wherein the 3D OM output axis is shown as the x axis and the axis along which the atom beam deflection occurs is the z axis.

As illustrated in FIGS. 3A and 3B, in a first stage, a beam of atoms is prepared from an initial atomic vapor by two pairs of transversely applied counterpropagating laser beams 301a/301b and 301c/301d and a longitudinally applied push beam 309 under an applied magnetic field (not shown), where the laser beams and magnetic field generate a two-dimensional magneto-optical trap (2D+ MOT) and produces a narrow, collimated, and transversely cooled beam of atoms 317a typically having a most-probable velocity between 5 and 40 m/s, an initial transverse diameter <1 mm, and a divergence angle 1°. In an exemplary case, the 2D+ MOT transverse cooling beams 301a/301b have beam waists 5 mm by 20 mm, optical power 30 mW per beam, though beams having other parameters can also be used as appropriate. The frequency detuning $\Delta_{2D}$ in the initial cooling region is typically in the range $\Delta_{2D}=-2\Gamma_0$ to $\Delta_{2D}=-1/2\ \Gamma_0$, where $\Gamma_0$ is the natural linewidth of the atomic cooling transition. In an exemplary case, the cooled atomic species may be $^{87}$Rb and the cooling transition may be the 5 $^2S_{1/2}$ to 5 $^2P_{3/2}$ transition, with $\Gamma_0=2\pi\times6.1$ MHz. It will be understood by one skilled in the art, however, that the described beam characteristics and detuning values used are exemplary only, and the characteristics of the beam, the detuning values, and the atomic species used in any given case may vary. In addition, one skilled in the art will readily recognize that any one or more of these cooling beam parameters can be tuned to provide an initially 2D-cooled beam having an atomic flux of at least $10^9$ atoms/s, transverse temperature near to the Doppler limit (140 μK in Rb), and transverse dimension of approximately 1 mm.

This initially cooled beam travels into the second region through an aperture 331, described in more detail below, where it is further cooled by a continuously operating, moving 3D optical molasses (3D OM) 313 consisting of three pairs of orthogonal counterpropagating laser beams (a first pair of which is shown as beams 311a/311b in the side view illustrated in FIG. 3A and the second and third pairs of which are shown in the top view illustrated in FIG. 3B as beams 311c/311d and 311e/311f) directed at the atom flow in the second stage. The optical molasses beam along the z axis can comprise a single beam that is retroreflected to form two counterpropagating beams travelling in the z– and z+ directions or can comprise two independent counterpropagating beams travelling in the z– and z+ directions. The molasses beams in the x-y plane are frequency-shifted to cool the atoms so that they are near-stationary in a predetermined moving frame of reference.

The three pairs of counterpropagating laser beams comprising the 3D OM 313 in the second stage perform two tasks simultaneously. First, the 3D OM further cools the atom beam in three dimensions by means of polarization gradient cooling, with the atom beam being cooled to sub-Doppler temperatures, i.e., to a final temperature between the recoil temperature $\hbar^2k^2/mk_B$ and the Doppler temperature $\hbar\Gamma_0/k_B$, where $\hbar$ is the reduced Planck constant, $k_B$ is the Boltzmann constant, m is the atomic mass, and k is the wavevector of the cooling light. Second, the 3D OM redirects the atoms by a predetermined small angle, typically less than 45°, e.g., by 10°, relative to the output axis of the 2D+ MOT so that the scattered light from the first stage 320 continues in a straight line and does not produce decoherence in the final atom beam 317b.

As noted above, in addition to the cooling beams applied in the left and right cooling regions to produce the 2D+ MOT and the 3D OM, appropriately configured repump beams known in the art are also applied to the atoms as they travel through the chamber to ensure that they remain at energy levels at which cooling can occur.

The two-stage method illustrated in FIGS. 3A and 3B has several advantages. In the first stage, the 2D+ MOT is accomplished by means of laser beams having small detuning and a high photon reabsorption cross-section which provides 2D Doppler cooling of the atoms in the atom beam, and further provides a large capture velocity, a narrow beam having a large atom flux, and large rate of optical scattering from both the hot background vapor and the cooled atom beam. In the second stage, the atoms are cooled by the 3D OM which has large detuning relative to the atom's resonant frequency; this large detuning improves (lowers) the final atom temperature, reduces the photon reabsorption cross-section, and provides a final atom beam with sub-Doppler temperatures in 3D, and a low optical scattering rate from the cold atoms. The capture velocity in the second stage is lower than in the first stage as a consequence of the lower optical forces resulting from the large detuning and polarization gradient cooling mechanism; however, this reduction is acceptable on account of the precooling and velocity selection performed by the first stage.

In addition, as described in more detail below, in accordance with the present invention, the central axis at which the atom beam travels in the second stage is at a small angle, typically less than 45°, offset from the axis in the first stage. This feature of the present invention has several advantages. First, it prevents near-resonant scattered light from the 2D+ MOT from inducing decoherence in the atoms which have exited the second cooling stage. Equally importantly, the small angular deviation allows for a small capture velocity in the second stage that reduces the rate of optical scattering from the atom beam, does not reduce the atom flux by velocity selection, and allows for the creation of a continuous, three-dimensionally cold atomic beam. Third, this feature makes it possible to introduce a push beam or other light propagating parallel to the axis of the first stage while preventing that light from propagating along the axis of the second stage or along the atom beam following the second cooling stage.

Figure 4:
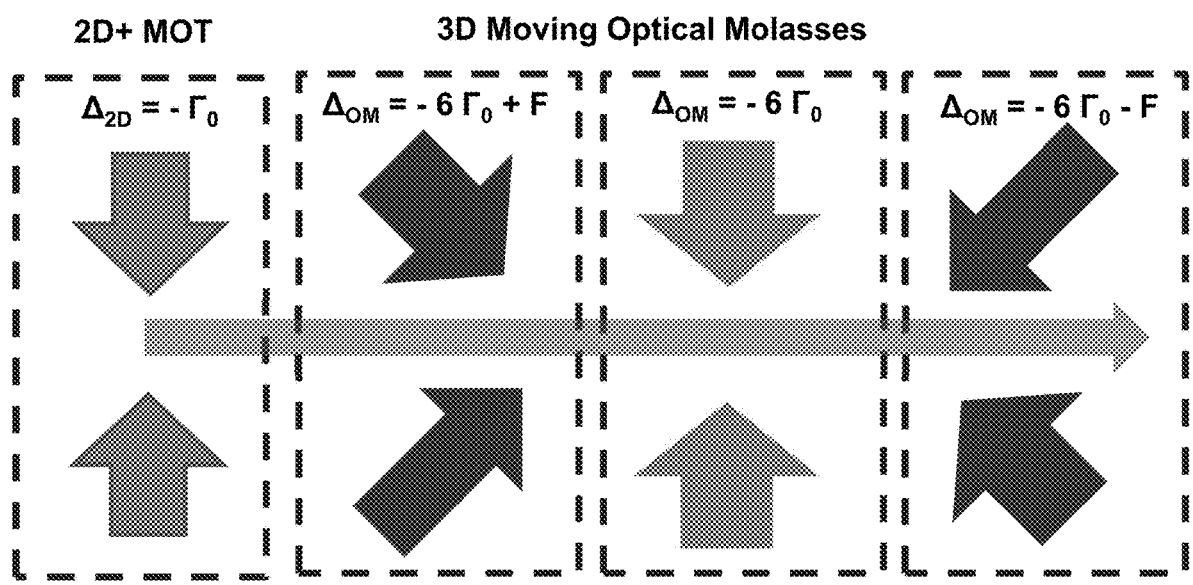
FIG. 4 is a block schematic further illustrating aspects of two-stage laser cooling of atoms in accordance with the present invention.

FIG. 4 further illustrates aspects of the two-stage process for producing a continuous, velocity-controlled three-dimensionally laser-cooled atom beam source having low fluorescence in accordance with the present invention. All of the laser beams shown are on continuously and simultaneously to produce the laser-cooled atom beam. Initial cooling and trapping of atoms from a provided warm vapor in 2 dimensions is performed by the 2D+ MOT. The cooling and trapping in the 2D+ MOT is performed at a frequency close to the atomic cooling resonance, for example $\Delta_{2D} = -\Gamma_0$. Magnetic field gradients along directions perpendicular to the 2D+ MOT propagation axis confine the atom beam transversely by inducing magneto-optical forces.

The resulting atom beam propagates into the 3D moving optical molasses region, where three pairs of counterpropagating laser beams induce 3D sub-Doppler cooling. One pair of optical molasses beams (shown as the center pair of beams in FIG. 4) having a relatively large detuning from the cooling resonance, for example $\Delta_{OM} = -6\Gamma_0$, propagates along the z− and z+ directions and cools the atomic motion along that direction. The other two pairs of laser beams forming the optical molasses are in the x-y plane, oriented at an angle relative to the x axis (e.g., 45° as shown in FIG. 4) and having wavelength detunings $\Delta+ = \Delta_{OM}+F$ and $\Delta− = \Delta_{OM}−F$, where +F and −F is the frequency shift of the forward and backward-propagating cooling beams, respectively. The moving optical molasses causes the atoms to move at a speed $v_{OM4}$ determined by the frequency difference between the forward-propagating and backward-propagating cooling beams. In the exemplary case illustrated in FIG. 4, where the beams are offset by 45°, the resulting speed of the atom beam is $v_{OM} = \sqrt{2}F/k$, where, as noted above, F is the frequency shift of the cooling beams relative to the atomic cooling resonance $\Gamma_0$ and k is the wavevector of the cooling light.

In the 3D moving optical molasses region, no magnetic field is desired as no magneto-optical trapping is required and a substantial magnetic field will increase the final temperature achieved after cooling.

Figure 5A:
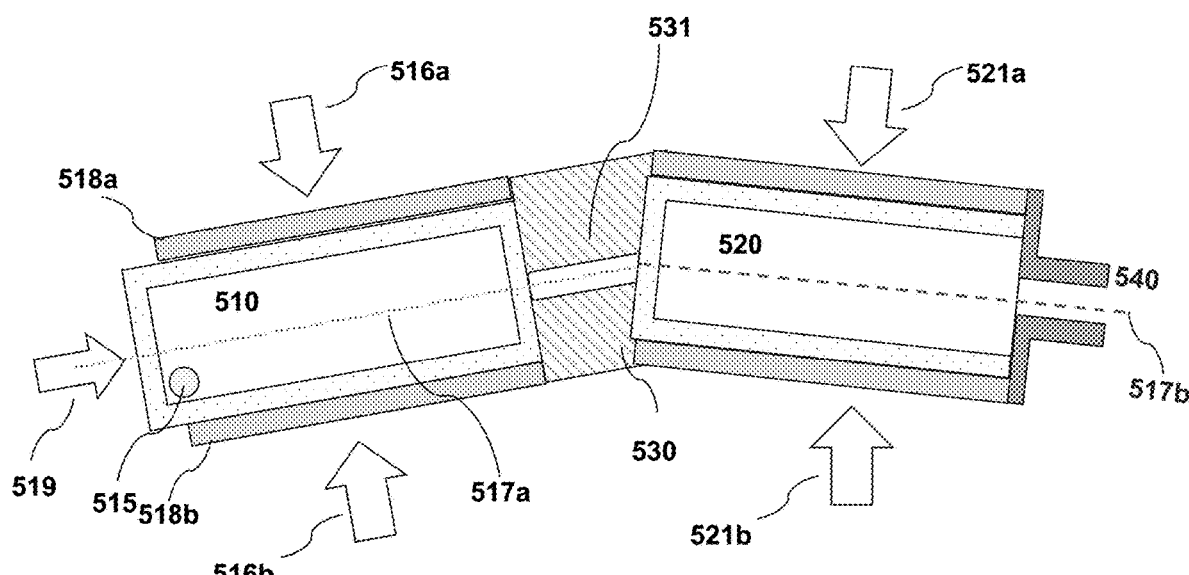
FIGS. 5A and 5B are block schematics illustrating aspects of an exemplary apparatus for two-stage laser cooling of atoms in accordance with the present invention.
Figure 5B:
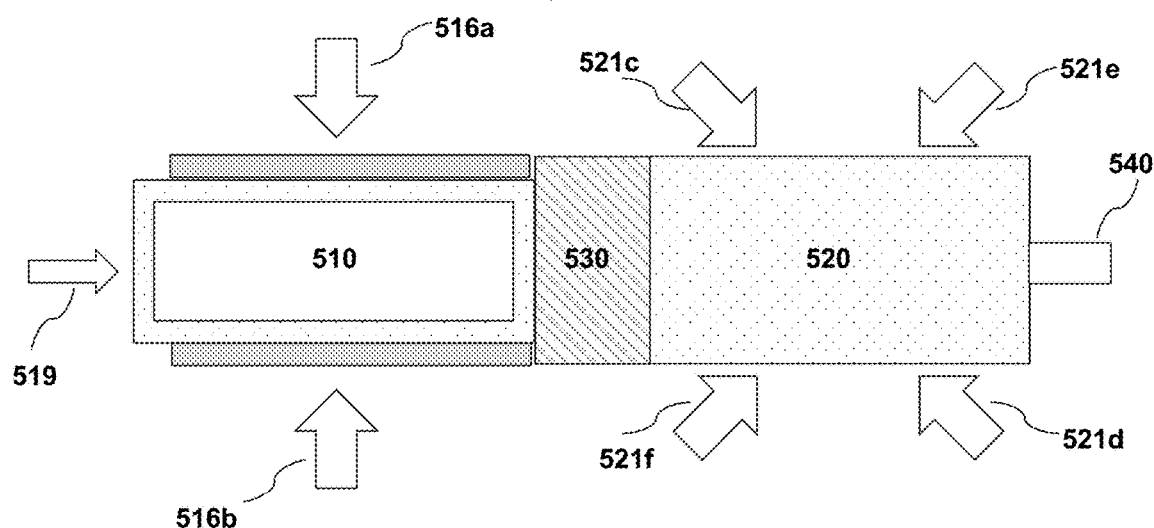

The block schematics in FIGS. 5A and 5B present side and top views, respectively, illustrating aspects of exemplary embodiment of an apparatus that can be used to produce a continuous, velocity-controlled three-dimensionally laser-cooled atom beam source having low fluorescence by means of the two-stage cooling method in accordance with the present invention.

As illustrated in FIGS. 5A and 5B and as described above, an apparatus for producing a continuous, velocity-controlled three-dimensionally laser-cooled atom beam source having low fluorescence in accordance with the present invention includes a first laser-cooling region, shown in FIGS. 5A and 5B as left cooling region 510, an intermediate region 530 having an aperture 531 therein, a second laser-cooling region, shown in FIGS. 5A and 5B as right cooling region 520, and an exit port 540, all situated within a common vacuum enclosure. The vacuum enclosure has a window on each side, where each window is substantially transparent and anti-reflective at the laser wavelengths used to cool the atom beam. One or more magnetic elements are situated on the inside or outside of the vacuum chamber. In the exemplary embodiment illustrated in FIGS. 5A and 5B, these magnetic elements comprise permanent magnets situated around the left cooling region and three pairs of magnetic coils in Helmholtz orientation situated around the right cooling region, but any suitable magnetic element, including coils, permanent magnets, or high-permeability materials, can be used. The magnetic elements serve to provide magnetic field gradients necessary for 2D magneto-optical trapping in the left cooling region, and to provide control of magnetic field bias and gradients in the right cooling region in order to optimize the temperature of the 3D OM.

Left cooling region 510 can include a metallic source or dispenser 515 which produces an atomic vapor within the left enclosure in a manner well known in the art, though in some cases, the atomic vapor can be produced externally and then introduced into the chamber. In an exemplary embodiment described herein, the atomic vapor comprises a vapor of Rubidium atoms since Rubidium is widely used in applications such as atomic clocks or interferometers, but other atomic vapors can be produced and used to form an atom beam in accordance with the present invention in cases where use of such other atoms is appropriate.

A set of first cooling laser beams comprising two pairs of counterpropagating transverse laser beams 516a/516b and 516c/516d are directed into the left cooling region, e.g., through optical windows or otherwise. Each of the two laser beam pairs 516a/516b and 516c/516d is substantially orthogonal to the left central axis and to the other laser beam pair and are stabilized to a frequency around one to two atomic natural linewidths lower than a resonance frequency of the atoms forming the atom beam, e.g., at a detuning of −6 MHz in the case of Rubidium, which has a natural linewidth $\Gamma_0 = 2\pi \times 6.1$ MHz. In addition, a two-dimensional magnetic field gradient (e.g., a 2D magnetic quadrupole field) is applied to the atom vapor with a line of minimum magnetic field amplitude along a left central axis of the left cooling region by means of permanent magnets or electromagnet coils 518a/518b extending along the length of the left cell.

The volume enclosed by the overlapping region of the initial cooling laser beams 516a/516b and 516c/516d and the magnetic field gradient in the left cooling region must be made large enough to achieve a high flux of atoms in the resulting 2D+ MOT. For example, typical beam waists (e' intensity radius) are 20 mm by 5 mm. The magnetic field gradient of at least a few G per cm in the directions transverse to the left central axis is sufficient to provide transverse confinement of atoms as they travel through the left cooling region. The cooling laser beam detuning and intensity combined with the cooling volume is sufficient to provide a capture velocity of 10 m/s or greater. Typically the laser intensity at the center of the cooling beams is on the order of the saturation intensity of the cooling transition (e.g., 17 mW/cm$^2$ in rubidium) or greater. The polarizations of the cooling beams are circular and, within each counterpropagating beam pair, the two cooling beam polarizations have the same helicity in order to induce magneto-optical trapping forces.

The two pairs of counterpropagating transverse laser beams and applied magnetic fields combine to produce a two-dimensional magneto-optical trap (2D+ MOT) in left cooling region 510 which produces a transversely cold beam of atoms 517a propagating along the central axis of the left cooling region. In many embodiments, an additional laser beam 519, sometimes referred to as a "push beam," also propagates substantially along left central axis to increase the atomic flux in the left cooling region. A magnetic shield (not shown) around the left and/or right cooling regions reduces the leakage of magnetic fields from the left cooling region into the right cooling region and other exterior regions.

In addition, as noted above, an apparatus for forming a continuous, velocity-controlled three-dimensionally laser-cooled atom beam source having low fluorescence by means of the two-stage cooling method in accordance with the present invention further includes a right cooling region 520, with left cooling region 510 and right cooling region 520 being joined by an intermediate region 530 which has an aperture 531 formed therein in a manner described in more detail below.

As illustrated in FIGS. 5A and 5B, right cooling region 520 is offset from left cooling region 510 such that the central longitudinal axis of the right cooling region 520 defined at an angle relative to the central longitudinal axis of the left cooling region 510. In many embodiments, this offset angle is 10° but other offset angles may be present in other embodiments. The angle must be sufficient such that there is no direct line-of-sight from the aperture 531 to the outside of exit port 540, and small enough that the redirection of atoms in the right cooling region is possible when considering that the capture velocity in the right cooling region is smaller than the capture velocity in the left cooling region.

The right cooling region of an apparatus in accordance with the present invention includes a laser source (not shown) configured to provide an optical molasses consisting of a set of three pairs of counterpropagating, mutually orthogonal laser beams 521a/521b, 521c/521d, and 521e/521f. This optical molasses can be introduced into right cooling region 520 by any suitable mechanism, e.g., by directing the laser beams through optical windows comprising the sides of the right cooling region or otherwise. The polarizations of the optical molasses beams may be circular, elliptical, or linear, chosen so as to implement polarization gradient cooling based on standard methods known in the art. The magnetic field in the right cooling region is close to zero to optimize the temperature achieved in polarization gradient cooling.

The volume enclosed by the overlapping region of the optical molasses beams 521a/521b, 521c/521d, and 521e/521f in the right cooling region, combined with the intensity and detuning of the cooling beams, must be sufficient to both cool the incoming beam from the 2D+ MOT into the intended new direction along the right central axis and also to achieve the desired final temperature in three dimensions. That is, the capture velocity of the moving OM is chosen to be equal to or greater than v sin θ and smaller than v, where v is the mean velocity of the atom beam exiting the 2D+ MOT and θ is the angle between the right central axis and the left central axis.

In an exemplary case, the waist of optical molasses beams 521a and 521b is approximately 5 mm by 20 mm, while the waists of optical molasses beams 521c/d/e/f are approximately 1 cm, though beams having other waist dimensions may also be used as appropriate and will produce the necessary cooling parameters.

The detunings of the transverse optical molasses beams 521a and 521b propagating in the +z/−z direction are equal and are chosen to be large compared with the detuning of the 2D+ MOT cooling beams, for example, $\Delta_{OM}=-6\ \Gamma_0$. As described above, the detunings of the forward- and backward-propagating optical molasses beams 521c/f and 521d/e depend on the angular offset of those beams relative to the transverse beams 521a and 521b, and are $\Delta_{OM} \pm F$. In an exemplary case, where the angle of beams 521c/d/e/f is 45° relative to the longitudinal axis of the right laser-cooling region, the frequencies of forward-propagating optical molasses beams 521c and 521f are shifted higher relative to the frequencies of beams 521a and 521b by an amount $F=kv_{OM}/\sqrt{2}$, while the frequencies of backward-propagating optical molasses beams 521d and 521e are equal and shifted lower in frequency relative to the frequencies of beams 521a and 521b by the same amount.

The left and right cooling regions are separated by an intermediate region 530 having an aperture 531 formed therein, where intermediate region 530 is situated at an angle relative to the left cooling region and is made of a material that is opaque to the wavelength of all laser beams in the left cooling region, thereby reducing the amount of light that can propagate from the left cooling region into the right cooling region. For example, if the first cooling laser beams 516a/b/c/d and laser push beam 519 have wavelengths of approximately 780 nm, intermediate region 530 can be formed from silicon so as to be opaque to those beams, though other materials may be used as appropriate for laser beams having different wavelengths. Aperture 531 consists of an open tube or hole that is substantially coaxial with the central axis of the left cooling region and is offset from the central axis of the right cooling region, with a diameter that is sufficiently large to allow the transversely cooled atom beam 517 from the left cooling region to pass into the right cooling region but is sufficiently small to restrict any conductance of extraneous atoms from the atomic vapor from the left cooling region into the right cooling region.

In some implementations of this design, one or more mirrors can be added inside of right cooling region 520 in order to minimize the possibility of higher-order reflections through exit port 540.

As noted above, as atoms from atom beam 517 travel into the right cooling region 520, they are subjected to an optical molasses consisting of three pairs of mutually orthogonal counterpropagating laser beams 521a/521b, 521c/521d, and 521e/521f that are directed into right cooling region 520. These laser beams cool all three dimensions of motion in atom beam 517b into a moving frame of reference that propagates parallel to the right central axis, such that the atom beam is redirected from its trajectory at the output of the left cooling region. All beams are fired simultaneously so as to be continuously on while the atom beam travels through the chamber, with the wavelengths of the laser beams being tuned as described above to obtain a desired three-dimensionally cooled atom beam having characteristics desirable for the application in which it is to be used.

The polarizations of the optical molasses laser beams are chosen to induce polarization gradient cooling into a moving frame of reference, resulting in an atomic velocity distribution below the Doppler cooling limit.

The resulting mean velocity of the 3D-cooled atom beam 517b is determined by the combination of frequency differences and geometry of the 3D optical molasses applied in the right cooling region. The laser frequency differences can be modified by any suitable means such as radio frequency driving signals from acousto-optic modulators that shift the frequencies of the laser beams, electro-optic modulators, or multiple independent frequency-locked lasers. The mean frequency of the right cooling region's laser beams is detuned by a greater amount from atomic resonance than the left cooling region's laser beams. This results in reduced probability of reabsorption of cooling light scattered by the atoms or scattered from the surfaces of the device.

Finally, an exit port 540 is situated to the right of the right cooling region and comprises an open tube that is substantially coaxial with the central axis of the right cooling region. Like aperture 531, exit port 540 is made from a material that is opaque to the wavelength of the laser beams and has a diameter large enough to allow the transmission of the 3D-cooled and redirected atom beam 517b from the right cooling region but completely blocks the direct line of sight from the left cooling region to the downstream trajectory of the atom beam.

Thus, as described herein, the present invention provides a method and an apparatus for two-stage cooling of an atom beam that has several advantages over the prior art.

For example, the method and apparatus of the present invention provide a continuous high atom flux of over $10^9$ atoms/second, enabling high signal-to-noise measurement with high measurement bandwidth and without dead time.

The method and apparatus of the present invention also provide an atom beams having sub-Doppler atom temperatures (i.e., having a narrow velocity distribution) below, e.g., 20 micro Kelvin (20 µK) in three dimensions in the case of Rb atoms, which enables the production of high fringe contrast in atom interferometry or clock applications. In some embodiments, it may be possible to tune the cooling beams so as to achieve temperatures within an order of magnitude of the recoil limit, for example, ~2 µK in Rb.

The method and apparatus of the present invention provides precisely known and dynamically controllable mean atom velocity over at least a factor of 2 via rf frequency control, which enables active change in bandwidth of the atom beam and response to platform dynamics.

The method and apparatus of the present invention provides an atom beam having a narrow transverse size of approximately 2 mm, which enables low-background measurement and minimization of position-dependent measurement errors.

The method and apparatus of the present invention produces very low emission of light at or near atomic resonance frequencies along the atomic trajectory, minimizing the reduction of quantum coherence that results from spontaneous emission due to interaction with near-resonant light.

The method and apparatus of the present invention produces very low background atomic gas due to the small aperture between the left and right cooling regions and due to the velocity selection inherent in redirection of the atomic beams from the left cooling region to the right cooling region.

These features combine to provide a continuous source of atoms that may be used as an input to an atom-based clock, field sensor, or inertial measurement device (gyroscope, accelerometer, gravimeter, or gravity gradiometer) to enable high-bandwidth measurement without dead time (i.e., with 100% duty cycle), and with high sensitivity and stability that are provided by high flux, narrow spatial distribution, and narrow velocity distribution. These features also improve operation of such clocks and sensors in dynamic—i.e., vibrating, rotating or accelerating—environments.

The subject methodology and device is the first atom beam source to combine continuous operation, high atom flux, sub-Doppler cooling in three dimensions, and suppression of near-resonant light along the downstream atom trajectory.

Alternatives

The apparatus and methods described herein are exemplary only and one skilled in the art will readily understand that modifications may be made and that other embodiments may be implemented within the scope and spirit of the present invention. Such alternative embodiments may include but are not limited to the following:

To further suppress propagation of scattered light down the atomic trajectory, an aperture, tube, nozzle, aperture array, or microchannel plate may be placed along the atom trajectory to allow atoms to propagate while reducing the propagation of light.

To further suppress propagation of scattered light, surfaces within or surrounding the vacuum cell may be coated with a light-absorbing coating or made from light-absorbing materials.

Instead of being housed in a vacuum cell consisting of two connected glass cells, the two cooling regions may be integrated into a single vacuum cell or cells having different geometry or materials.

Other means of deflection of the atom beam may be used, including pushing using near-resonant light, deflection using magnetic fields, deflection using optical potentials, deflection from magnetic surfaces, or deflection using evanescent potentials from surfaces.

More than two atom cooling stages may be used including additional optical molasses stages with different optical intensities or frequencies or Raman sideband cooling stages to further reduce the atomic velocity distribution.

The left cooling region may consist of a different type of atom beam source other than a 2D-MOT, including a 3D-MOT with continuous atomic exit channel, low-velocity intense source (LVIS), a Zeeman slower, or a slowed atom beam.

The right cooling region may use any geometry for moving optical molasses, including methods with frequency shifts imparted to one, two, or three pairs of counterpropagating laser beams, or methods in which the laser beams do not counterpropagate, so long as the cooling geometry results in cooling into a moving frame of reference with velocity substantially parallel to the right central axis.

A moving optical lattice stage may be introduced following the cooling region to transport atoms along a desired trajectory at a desired velocity.

The laser beams may be introduced into the vacuum cell via optical waveguides or fibers rather than windows.

A magnetic shield may be placed around the left cooling region, or around the right cooling region, or both.

The cooling laser beams may incorporate a spatial variation in intensity or frequency designed to optimize the atomic temperature or flux-for example, a gradient in intensity and detuning such that the atom input (left) side of the beam has the highest intensity and lowest detuning, while the output side has the lowest intensity and highest detuning.

The frequency differences of the cooling beams in the right cooling region may be determined by acousto-optic modulators, electro-optic modulators, frequency offset locked lasers, or other means.

These and any other embodiments, aspects, and features that may be envisioned by those skilled in the art are deemed to be within the spirit and scope of the underlying invention described and claimed herein.

What is claimed is:

1. A method for forming a continuous, velocity-controlled three-dimensionally laser-cooled atom beam, comprising:
providing a vacuum enclosure comprising a first laser-cooling region joined via an aperture with a second laser-cooling region, a longitudinal axis of the second laser-cooling region being offset at an angle relative to a longitudinal axis of the first laser-cooling region;

providing an atom vapor in the first laser-cooling region;

directing a first set of counterpropagating laser beams into the atom vapor in the first laser-cooling region under an applied magnetic field, the first set of counterpropagating laser beams comprising two pairs of beams offset from one another by a first predetermined angle, the first set of laser beams and the magnetic field forming a two-dimensional magneto-optical trap (2D+ MOT) that causes the atom vapor to form an initial transversely cooled atom beam travelling through the first laser-cooling region, through the aperture, and into the second laser-cooling region; and directing a second set of counterpropagating laser beams into the transversely cooled atom beam in the second laser-cooling region, the second set of counterpropagating laser beams comprising a first pair of counterpropagating beams travelling along a z+/z− axis and further comprising a second and third pair of counterpropagating beams propagating in an x-y plane, the second and third pair of counterpropagating beams being separated from one another by a second predetermined angle, the second set of counterpropagating laser beams forming a three-dimensional optical molasses (3D OM);

each of the beams forming the 2D+ MOT and each of the beams forming the 3D OM having a corresponding wavelength, the wavelength of each beam having a predetermined difference from a resonance frequency of the atoms in the atom vapor, all of the beams forming the 2D+ MOT and the 3D OM being fired simultaneously and continuously as the atoms travel through the enclosure; and wherein the 3D OM beams cool the initial transversely cooled atom beam in three dimensions to a predetermined sub-Doppler temperature and to a predetermined mean velocity as it travels through the second laser-cooling region to continuously produce a velocity-controlled three-dimensionally cooled low-fluorescence atom beam.

2. The method according to claim 1, further comprising applying an initial laser push beam to the atom vapor to increase the atom flux in the first laser-cooling region.

3. The method according to claim 1, wherein the wavelengths of the beams forming the 2D+MOT have a frequency detuning from a resonant frequency of the atoms in the atom vapor between $-2\Gamma_0$ and $31\ 1/2\Gamma_0$ and the wavelengths of the beams forming the 3D OM each have a corresponding mean frequency detuning from the resonant frequency of the atoms in the atom vapor between $-10\Gamma_0$ and $-2\Gamma_0$, where $\Gamma_0$ is a natural linewidth of a cooling resonance of the atoms in the atom vapor.

4. The method according to claim 1, further comprising applying a repump beam to the atoms as they travel through the first and second laser-cooling regions to ensure that the atoms maintain an energy level that permits cooling of the atoms to occur.

5. An apparatus for forming a continuous, velocity-controlled three-dimensionally laser-cooled atom beam, comprising:

a two-stage vacuum enclosure comprising a first laser-cooling region and a second laser-cooling region joined to the first laser-cooling region via an intermediate region that is opaque to a wavelength of laser beams in the first laser-cooling region, the intermediate region having an aperture formed therein to join with the second laser-cooling region, a longitudinal axis of the second laser-cooling region being offset from a longitudinal axis of the first laser-cooing region;

the first laser-cooling region including at least one magnetic element configured to apply a magnetic field to atoms in the first laser-cooling region;

first laser sources that direct a first set of counterpropagating laser beams comprising two beams offset from one another by a predetermined angle into atoms in the first laser-cooling region in the presence of the magnetic field, the first set of counterpropagating beams and the magnetic field forming a two-dimensional magneto-optical trap (2D+ MOT) that transversely cools the atoms in the first laser-cooling region and causes them to form an atom beam that travels into the second laser-cooling region via the aperture; and second laser sources that apply a second set of counterpropagating laser beams to the atom beam in the second laser-cooling region, the second set of counterpropagating laser beams comprising a first pair of counterpropagating beams travelling along a z+/z− axis and further comprising a second and third pair of counterpropagating beams propagating in an x-y plane, the second and third pair of counterpropagating beams being separated from one another by a second predetermined angle, the second set of counterpropagating laser beams forming a three-dimensional optical molasses (3D OM) in the second laser-cooling region;

wherein the first set of beams forming the 2D+ MOT and the second set of beams forming the 3D OM all are fired simultaneously and continuously as the atoms travel through the enclosure;

wherein each of the beams forming the 2D+ MOT and each of the beams forming the 3D OM has a corresponding wavelength, the wavelength of each beam having a predetermined difference from a resonance frequency of the atoms in the atom vapor, all of the beams forming the 2D+ MOT and the 3D OM being fired simultaneously and continuously as the atoms travel through the enclosure; and wherein the 3D OM beams cool the initial transversely cooled atom beam in three dimensions to a predetermined sub-Doppler temperature and to a predetermined mean velocity as it travels through the second laser-cooling region to continuously produce a velocity-controlled three-dimensionally cooled low-fluorescence atom beam.

6. The apparatus according to claim 5, wherein the wavelengths of the beams forming the 2D+ MOT have a frequency detuning from a resonant frequency of the atoms in the atom vapor between $-2\Gamma_0$ and $-1/2\Gamma_0$ and the wavelengths of the beams forming the 3D OM each have a corresponding mean frequency detuning from the resonant frequency of the atoms in the atom vapor between $-10\Gamma_0$ and $-2\Gamma_0$, where $\Gamma_0$ is a natural linewidth of a cooling resonance of the atoms in the atom vapor.

* * * * *